United States Patent [19]
Porowski

[11] Patent Number: 4,575,129
[45] Date of Patent: Mar. 11, 1986

[54] PIPELOCK

[75] Inventor: Engelina Porowski, Pittsburgh, Pa.

[73] Assignee: O'Donnell & Associates, Inc., Pittsburgh, Pa.

[21] Appl. No.: 621,228

[22] Filed: Jun. 15, 1984

[51] Int. Cl.⁴ .............................................. F16L 21/06
[52] U.S. Cl. ..................................... 285/15; 285/421; 285/342; 285/417; 138/97
[58] Field of Search ............... 285/296, 339, 322, 323, 285/324, 412, 417, 378, 15, 342, 421, 330; 138/97

[56] References Cited

U.S. PATENT DOCUMENTS

| | | | |
|---|---|---|---|
| 826,154 | 7/1906 | Doolittle | 285/412 |
| 943,461 | 12/1909 | Reynolds | 285/412 |
| 1,054,904 | 3/1913 | Carpenter | 285/330 |
| 1,955,642 | 4/1934 | Laughlin | 285/328 |
| 2,776,153 | 1/1957 | Smith | 285/373 |
| 3,152,816 | 10/1964 | Smith | 285/15 |
| 3,284,112 | 11/1966 | Martin | 285/328 |
| 4,409,708 | 10/1983 | Hauffe | 285/373 |

FOREIGN PATENT DOCUMENTS

| | | | |
|---|---|---|---|
| 350608 | 3/1922 | Fed. Rep. of Germany | 285/322 |
| 2119893 | 11/1983 | United Kingdom | 138/97 |

Primary Examiner—Cornelius J. Husar
Assistant Examiner—Eric K. Nicholson
Attorney, Agent, or Firm—Joseph J. Carducci

[57] ABSTRACT

An improved pipelock comprising a first pair of rings facing each other axially, with the inner diameter of each ring at the outer face being smaller than the inner diameter of each ring at the inner face, each of said first pair of rings comprising at least two circumferential parts, means to restrain longitudinal movement of facing circumferential parts outwardly from each other, at least one second ring comprised of at least two circumferential parts connected to each other, outwardly surrounding said first pair of rings, and constraining outward radial movement of said first pair of rings, at least one third ring comprised of at least two circumferential parts, having an outer surface conforming to the inner surface of said first pair of rings, and at least one waffled fourth ring comprised of at least two circumferential parts having an outer surface in contact with the inner surface of said third ring.

5 Claims, 4 Drawing Figures

PIPELOCK

BACKGROUND OF THE INVENTION

1. Field of the Invention

This invention relates to an improved pipelock comprising a first pair of rings facing each other axially, with the inner diameter of each ring at the outer face being smaller than the inner diameter of each ring at the inner face, each of said first pair of rings comprising at least two circumferential parts, means to restrain longitudinal movement of facing circumferential parts outwardly from each other, at least one second ring comprised of at least two circumferential parts connected to each other, outwardly surrounding said first pair of rings, and constraining outward radial movement of said first pair of rings, at least one third ring comprised of at least two circumferential parts having an outer surface conforming to the inner surface of said first pair of rings, and at least one waffled fourth ring comprised of at least two circumferential parts having an outer surface in contact with the inner surface of said third ring.

2. Information Disclosure Statement

Circumferential and axial cracks tend to develop in piping systems subjected to stress corrosion cracking. These cracks generally occur in the heat-affected zones wherein pipes have been welded together and extend not only circumferentially around the pipe, axially along the pipe, but also through the thickness of the pipe wall. The pipes thus lose their strength and will separate from each other, resulting in leakage of the medium contained therein.

Pipes with detected cracks have been repaired by a weld overlay. However, once cracks have begun in the pipes they can also penetrate through the additional weld overlay. For such reason weld overlays have not been successful in eliminating the danger of circumferential cracks that develop in piping systems.

In application Ser. No. 539,074 for Novel Pipelock, filed Oct. 4, 1983, Jan S. Porowski and William J. O'Donnell, disclosed and claimed a pipelock for holding the ends of pipe or pipe fittings together, even if the cracks referred to above extend around the entire circumference of the pipes or pipe fittings and/or through the walls thereof. The Porowski et al pipelock also produces axial and circumferential compressive stresses at the weld location, thus reducing crack growth rates.

However, since the outer surface of a pipe is almost never axisymmetric, the application of the Porowski et al pipelock thereto will not result in the conformance of the inner surface of said third ring with the outer surface of the pipe. To fabricate a third ring whose inner surface conforms to the outer surface of the pipe, or to machine the outer surface of the pipe to conform to the inner surface of the third ring, would be prohibitively expensive. In reference to the latter possible modification, removal of material from the pipe surface is further highly undesirable, since the thickness of the pipe wall would be reduced. And yet effective contact between the inner surface of the third ring and the outer surface of the pipe is needed in order to effectively hold pipes on both ends of the pipe weld securely in place.

SUMMARY OF THE INVENTION

I have discovered that by providing the Porowski et al pipelock with an at least one waffled fourth ring comprised of at least two circumferential parts, having an outer surface in contact with the inner surface of the above-defined third ring, the abovedefined limitations are easily overcome, since the waffled ring will automatically adjust itself and conform to the inner surface of the third ring and the outer surface of the pipe upon application of radial load thereon.

My improved pipelock, therefore, comprises a first pair of rings facing each other axially, with the inner diameter of each ring at the outer face being smaller than the inner diameter of each ring at the inner face, each of said first pair of rings comprising at least two circumferential parts, means to restrain longitudinal movement of facing circumferential parts outwardly from each other, at least one second ring comprised of at least two circumferential parts connected to each other, outwardly surrounding said first pair of rings, and constraining outward radial movement of said first pair of rings, at least one third ring comprised of at least two circumferential parts having an outer surface conforming to the inner surface of said first pair of rings, and at least one waffled fourth ring comprised of at least two circumferential parts having an outer surface in contact with the inner surface of the said third ring.

The improved pipelock defined and claimed herein can better be illustrated by reference to the accompanying drawings.

Figure 1:
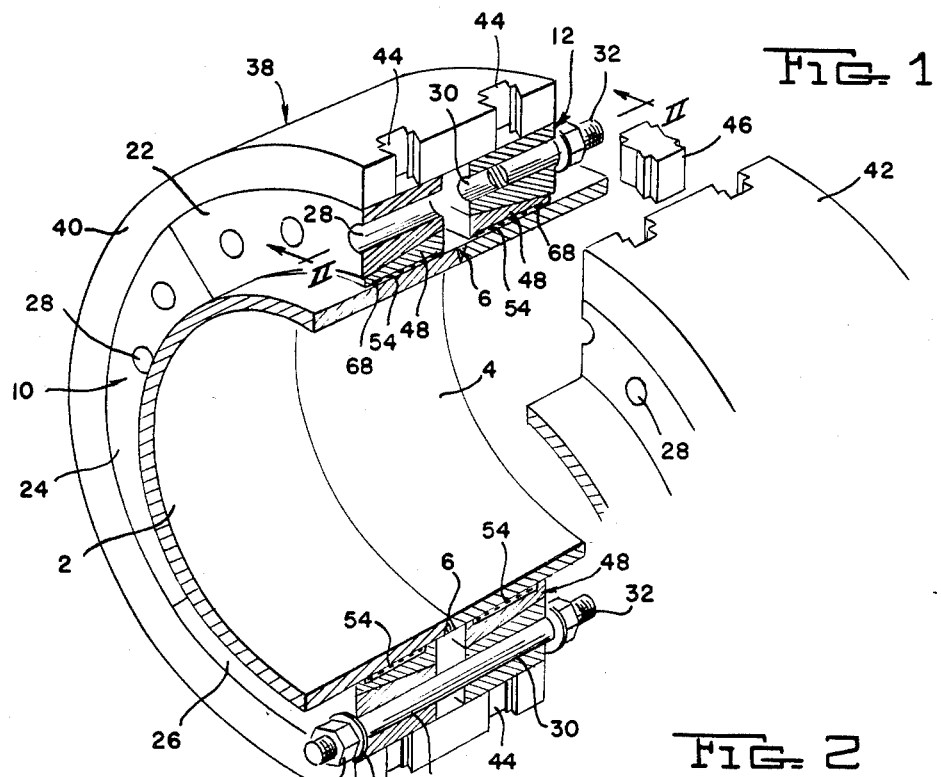
FIG. 1 is a view in perspective of the improved pipelock mounted on the pipe.
Figure 2:
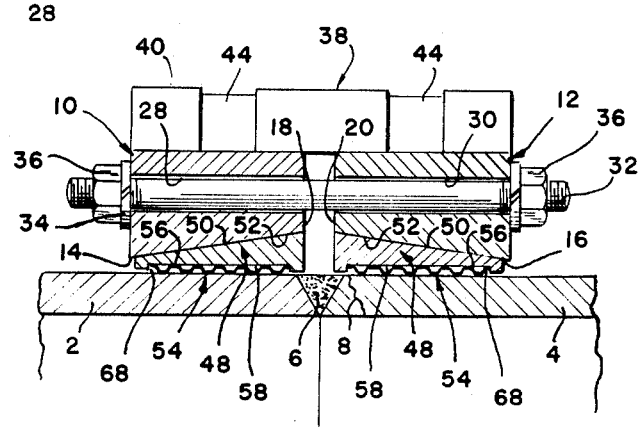
FIG. 2 is a section taken along II—II in FIG. 1.

Referring to FIGS. 1 and 2, reference numerals 2 and 4 refer to abutting pipes that have been welded together by circumferential weld 6. A circumferential crack 8 has already developed in pipe 4.

FIGS. 1 and 2 show the improved pipelock herein in place in the situation described that more effectively will hold the ends of pipes 2 and 4 together and more effectively will stabilize the relationships of the pipe ends to each other. Reference numerals 10 and 12 refer to a first pair of rings having inner diameters at the outer faces 14 and 16 respectively, smaller than the inner diameters at the inner faces 18 and 20, respectively of each ring. Each of said first pair of rings comprise at least two circumferential parts. This can be seen from FIG. 1, which discloses circumferential parts 22, 24 and 26 in ring 10. Ring 12 and the remaining portions of ring 10 are similarly provided with circumferential parts. Rings 10 and 12 are provided with any suitable means to restrain longitudinal movement of facing circumferential parts outwardly from each other. This can be done, for example, by using the means illustrated in FIGS. 1 and 2. Thus facing circumferential parts of rings 10 and 12 can be provided with aligned openings 28 and 30 through which passes a double-ended bolt 32 threaded on each end thereof and adapted to receive lock washers 34 and nuts 36. To constrain outward radial movement of the first pair of rings 10 and 12, there is provided at least one second ring 38 comprised of at least two circumferential parts 40 and 42 connected to each other in any suitable manner. This can be done, for example, by using the means illustrated in FIG. 1, wherein the second ring 38 is provided with at least one pair of keyways 44 in which fits a double interlocking key 46.

Reference numeral 48 refers to a third ring, comprised also of at least two circumferential parts. FIGS. 1 and 2 illustrate a preferred embodiment where the third ring is comprised of a pair of rings. The third ring 48 has an outer surface 50 conforming to the inner surfaces 52 of the first pair of rings 10 and 12.

In accordance with the novel improvement herein, the novel pipelock herein is provided with at least one waffled fourth ring 54 having an outer surface 56 in contact with the inner surface 58 of third ring 48. FIGS. 1 and 2 illustrate a preferred embodiment wherein the waffled fourth ring 54 is also comprised of a pair of rings. At least a portion of the inner surface 60 of the waffled fourth ring 54 will be in contact with the outer surfaces of pipes 2 and 4.

Figure 3:
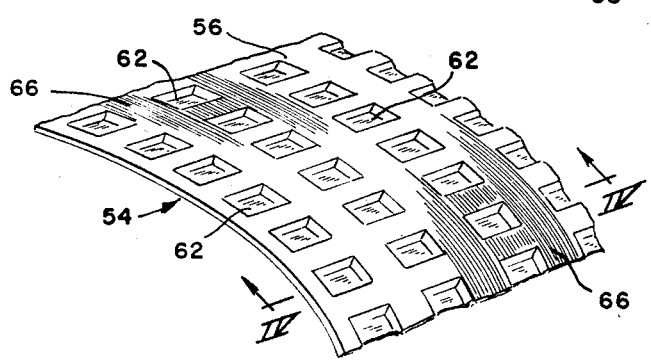
FIG. 3 is a perspective embodiment of the waffled fourth ring.
Figure 4:
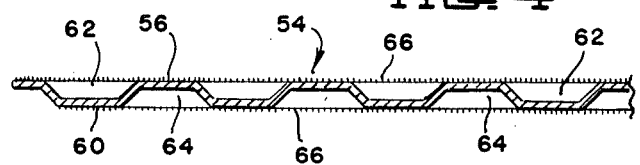
FIG. 4 is a section taken along IV—IV in FIG. 3.

Waffled fourth ring 54 can further be understood by reference to FIGS. 3 and 4. There can be seen that it is provided with a number of indentations 62 on the outer surface thereof and 64 on the inner surface thereof. Although indentations 62 and 64 are shown to be rectangular in form, they can be square, circular, or any other suitable configuration.

It can be seen that with the waffled fourth ring 54 in place, the fact that pipes 2 and 4 are not axisymmetric poses no problem, since waffled fourth ring 54 will adjust itself and will automatically conform to the outer surfaces of pipes 2 and 4 upon application of radial load thereon.

In a preferred embodiment at least one of the surfaces of waffled fourth ring 54 is provided with serrations, or similar projections, 66. When only one surface carries serrations thereon, it is preferred that they be on the inner surface 60 in contact with pipes 2 and 4. As shown in FIG. 4 these serrations are preferably disposed on both the inner and outer surfaces of waffled fourth ring 54. These serrations will tend to inhibit axial movement of the pipelock on the pipe surfaces.

In still another preferred embodiment, third ring 48 is provided with recesses 68 in the inner surface thereof in which waffled fourth ring 54 can be disposed to further inhibit axial movement thereof relative to third ring 48.

Obviously, many modifications and variations of the invention, as hereinabove set forth, can be made without departing from the spirit and scope thereof, and therefore, only such limitations should be imposed as are indicated in the appended claims.

I claim:

1. An improved pipelock adapted to surround and to grip a pair of nonaxisymmetric pipe ends joined by a weldment to produce axial and circumferential compressive stresses at the weld location and thereby reduce crack growth rates comprising a first pair of rings facing each other axially, with the inner diameter of each ring at the outer face being smaller than the inner diameter of each ring at the inner face, each of said first pair of rings comprising at least two circumferential parts, means to restrain longitudinal movement of facing circumferential parts outwardly from each other, at least one second ring comprised of at least two circumferential parts connected to each other, outwardly surrounding said first pair of rings, and constraining outward radial movement of said first pair of rings, a pair of third rings, each comprised of at least two circumferential parts having outer surfaces conforming to the inner surfaces of said first pair of rings, and a pair of waffled fourth rings, each comprised of at least two circumferential parts having outer surfaces in contact with the inner surfaces of said third pair of rings and having inner surfaces facing the outer surface of a pipe adapted to fit therethrough, said pair of waffled fourth rings being capable of automatically adjusting themselves and conforming to the inner surfaces of said third pair of rings and the outer surface of said nonaxisymmetric pipe ends upon application of radial load thereon.

2. The improved pipelock of claim 1, wherein said first pair of rings is provided with at least one pair of axial openings facing each other, a bolt mounted in said pair of openings and means disposed on each end of said bolt to restrain outward movement of said circumferential parts outwardly from each other.

3. The improved pipelock of claim 1 wherein at least one of the surfaces of said waffled fourth ring is provided with serrations thereon.

4. The improved pipelock of claim 1 wherein the inner surface of said waffled fourth ring is provided with serrations thereon.

5. The improved pipelock of claim 1 wherein said third ring is provided with recesses in the inner surfaces thereof in which said waffled fourth ring is disposed.

* * * * *